Oct. 3, 1939.    D. A. SHEPHERD ET AL    2,174,951
ELECTRIC HEATER
Filed May 25, 1937    2 Sheets-Sheet 1

Inventors
David A. Shepherd,
Marcus C. Stewart.

By Munn, Anderson & Liddy
Attorneys

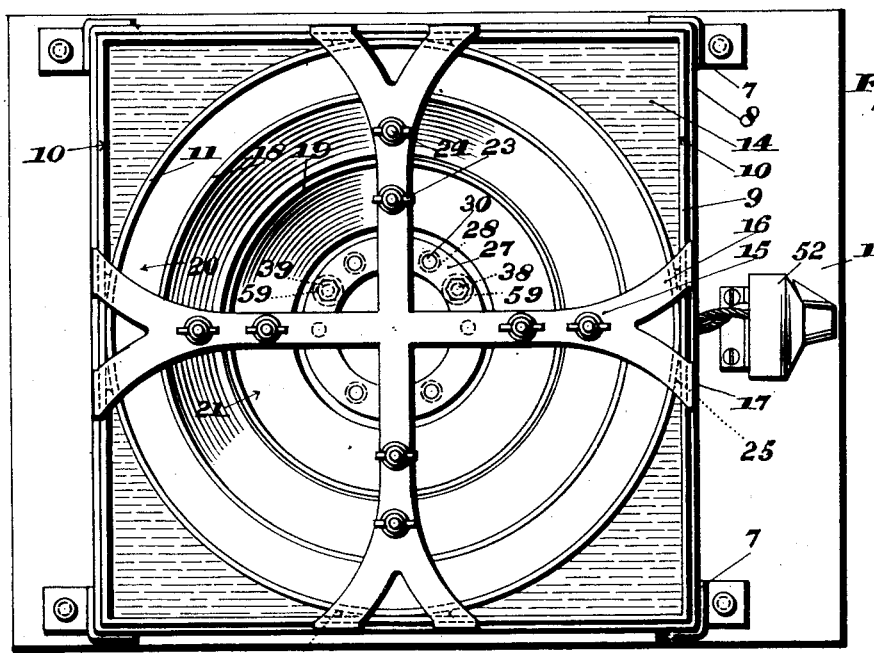
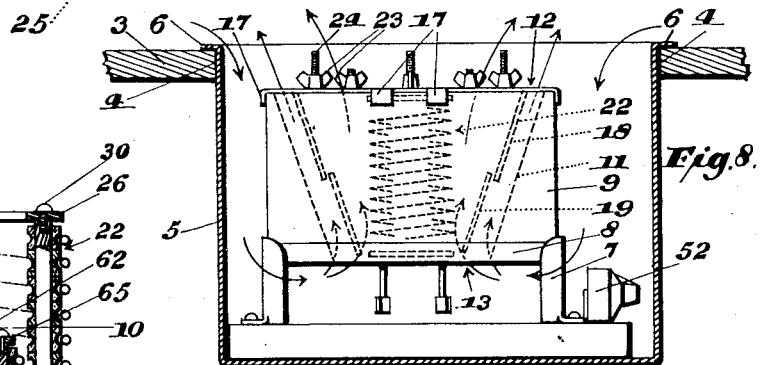
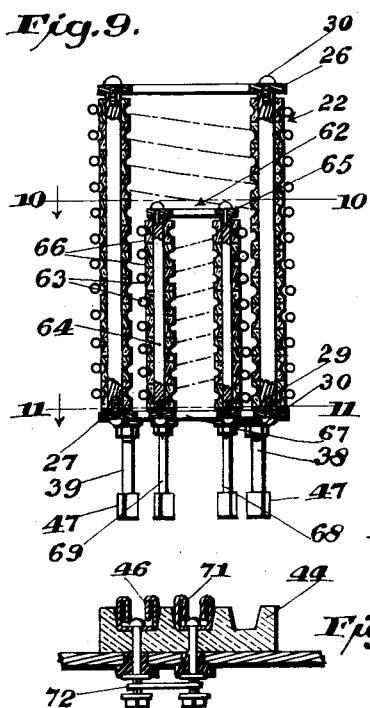
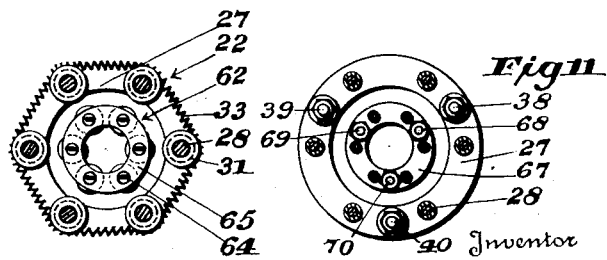
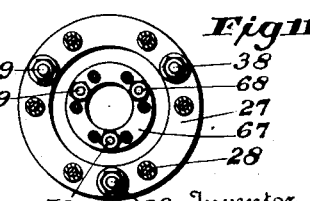
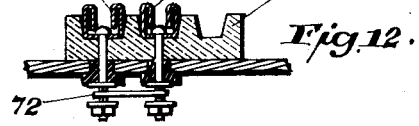

Patented Oct. 3, 1939

2,174,951

UNITED STATES PATENT OFFICE 2,174,951

ELECTRIC HEATER

David A. Shepherd and Marcus C. Stewart, Sewanee, Tenn.

Application May 25, 1937, Serial No. 144,739

5 Claims. (Cl. 219—38)

This invention relates to improvements in electric heaters and its objects are as follow:

First, to provide an electric heater which not only furnishes heat but also has provision for both humidifying the air and controlling the humidity.

Second, to provide a water jacket around the heating element for the purposes of insulation, as brought out below, and the supply of moisture.

Third, to control the humidity by the setting of an adjustable shield between the heating element and the inner wall of the water jacket or container.

Fourth, to provide an increase of circulation of air over that accomplished in known electric heaters, by a virtually complete ventilation of the heating element.

Fifth, to provide an easy disassemblage of the parts of the heater for the purposes of cleaning, replacement and the like.

Sixth, to provide an electric heater which can either be stood upon the floor or other similar surface, or suspended below the floor in a box which is hung in an opening in the floor.

Seventh, to provide a double heating capacity by supplementing the main heating element with a smaller heating element situated inside of the former.

Other objects and advantages will appear in the following specification, reference being had to the accompanying drawings, in which:

Figure 7 is a plan view of the heater.

Figure 8 is a partial sectional and elevational view showing how the heater can be suspended below the floor in a box.

Figure 9 is a detail sectional view of the double heating element.

Figure 10 is a cross section taken on the line 10—10 of Fig. 9.

Figure 11 is a cross section taken on the line 11—11 of Fig. 9.

Figure 12 is a sectional view of one of the insulating blocks, modified to suit the double heating element.

Figure 1:
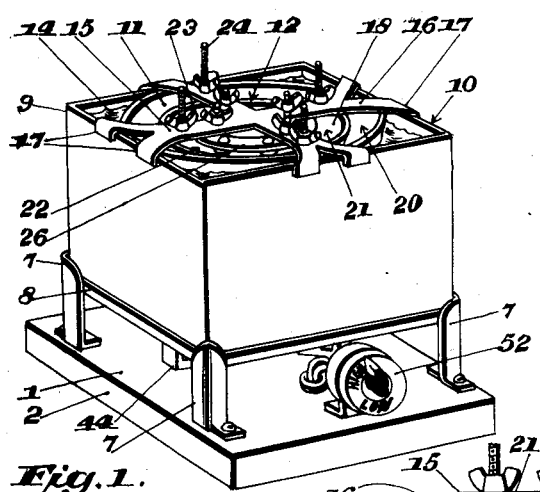
Figure 1 is a perspective view of the improved electric heater showing it as it appears when set upon the floor.

As already indicated in some of the foregoing statements of the objects of the invention, one of its main purposes is to provide an electric heater which not only heats a current of air, but also humidifies the air in such percentages as are permitted by a simple and novel control that is incorporated in the heater. The humidification of the air obviously requires a supply of moisture, and the container which is filled with water is made to serve the double purpose of supplying the moisture, as already stated, also to so insulate the heating element that there is a distinct separation between the outside relatively cold air currents and the inside heated air currents. All of this will be made plain from the drawings to which attention is now directed.

A base 1 provides the mount for all of the mechanism of which the heater is composed. This base can be made in a variety of ways, but according to the disclosure it is composed of a metal sheet which is flanged at 2 around the four sides (Fig. 2) to provide the necessary depth. The internal space afforded by the flanges is occupied in part by the wiring which supplies the current to the heating element. In practice this base will be insulated as may be required in addition to the insulating bushings shown and later described.

Ordinarily the base is intended to be set upon the floor or upon some other equivalent surface. This is suggested in Fig. 1 but in accordance with Fig. 8 the floor 3 is provided with an opening 4 in which a box 5 is suspended. This box must be deep enough to contain the entire heater as shown, and if it be so desired, the supporting flanges 6 can be continued across the top in the form of a grille so as to render the presence of the heater less conspicuous. This grille, if used, will be removed when the user reaches down to turn the knob of the resistance one way or the other.

Reverting to Fig. 1, four legs 7 are riveted or otherwise secured to the base 1, the upper part of these legs fixedly carrying an angle iron frame 8 in which the water container 9 of the heater is set. This container is nothing more than a box open at the top, as at 10 (Fig. 7) and provided on the inside with a wall 11 either in the form of the downwardly tapering truncated cone shown, or of cylindrical form. The tapering wall shown is preferred because the natural expansion of the warmed air at the upper outlet 12 causes a rather forceful drawing in of the cooler air at the bottom inlet 13, so that the warming process is materially speeded up. As the warmed air passes through the outlet 12 it picks up the moisture given off at the surface of the water 14 (Fig. 7) thus humidifying the air. The amount of humidity thus picked up is subject to control as presently appears. A grid 15 is merely set on top of the container 9. This comprises two crossed and connected bars, the ends of which are desirably spread at 16 and then turned down at 17 (Fig. 2) to hook over the edges of the container, and thus assure that the grid will stay in place. This grid constitutes the suspension member for a pair of truncated cones 18, 19. These two cones constitute an adjustable shield. They taper downwardly, and are sufficiently smaller than the downwardly tapering wall 11 which houses them to define an annular, upwardly flaring passageway 20.

The shield 18, 19 also defines a central air passageway 21, in which the heating element 22 is situated. The cones 18, 19 shield the water volume 14 from the heating element more or less directly, according to the adjustment of the cones, thus retarding or accelerating the warming of the water and the consequent evaporation. The percentage of humidity is thus regulated by the adjustment of the shield 18, 19.

Figure 2:
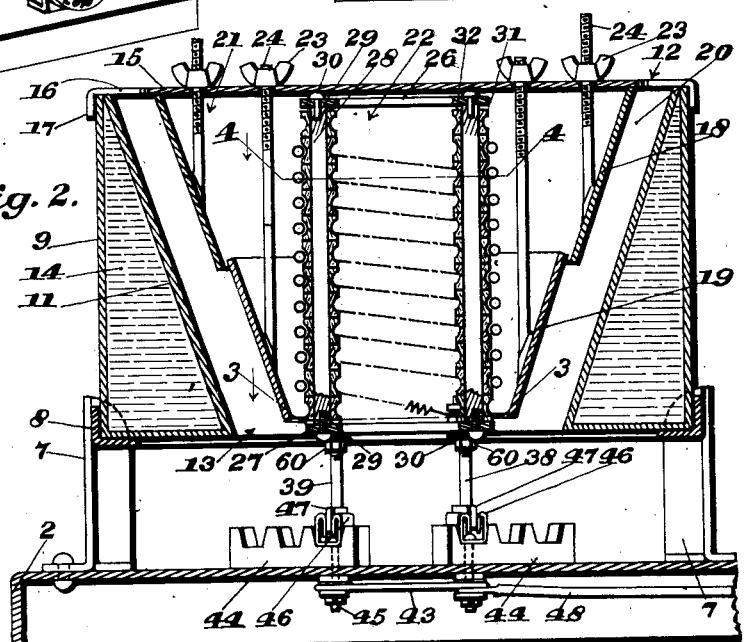
Figure 2 is a vertical section of the heater.

As seen in Fig. 2 the cones 18, 19 are in telescopic relationship to each other. They are extended virtually their full length so that the water volume 14 is almost entirely shielded from the heating element 22. The two cones 18, 19 can be let down or drawn up by means of wing nuts 23 upon the upper ends of screw stems 24 that extend through holes in the grid 15. The wing nuts bear down on top of the grid and it is easy to see that by properly adjusting the wing nuts of either one or the other of the two sets (Fig. 7) the corresponding cones 18, 19 will be set as desired so as to expose either the top or bottom portions of the container 9 to the direct heat with the result already named. In practice the cones 18, 19 can be made longer or shorter than shown so as to vary the extent of exposure of the water container to the heat from the element 22 at the different relative adjustments of the two cones.

Mention was previously made of the possibility of constructing the wall 11 in cylindrical form. This would also require a cylindrical form in the shield 18, 19. The adjustment of the two cones comprising the shield would be the same as just described. It should be stated that in introducing the frusto-conical wall 11 into the container 9 that the upper margins of the former will be secured to the latter at the four points of contact (Fig. 7) for example by solder connections 25. Obviously the bottom margin of the wall 11 must be so secured as to prevent the leakage of water.

Reference is now made to the details of the heating element 22. This comprises top and bottom metal rings 26, 27. The size of these rings both as to inner and outer circumference, thickness and width will vary in different sizes of heaters. These rings are disposed horizontally as shown and are held apart by a plurality of rods 28, the ends of which are drilled and tapped at 29 for the small screws 30 which are inserted in holes in the rings and driven into the rods to make a rigid assemblage.

Before completing this assemblage, stacks of porcelain insulators 31 are slipped on to the rods 28. These insulators are of known type, and the advantage of using a plurality of small ones is that the cracking of one or two of them will necessitate only a cheap replacement. If the insulators were of the long tubular type, the initial cost would be far greater than that of the individual insulators shown and the cracking of any one tubular insulator would mean a complete replacement for the entire rod affected.

The insulators 31 are quite loose upon the rods and it is preferable to leave a slight space 32 at the top of each stack (Fig. 2) to allow for expansion under heat. After all of the insulators have been emplaced and the top ring 26 is secured, the resistance wires 33, 34, are wound on in helical form over the various insulators, the grooves of which act as retainers.

Figure 6:
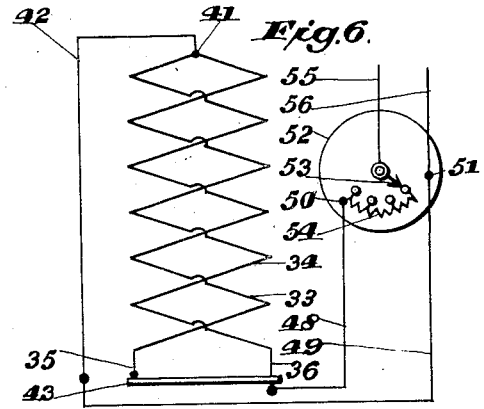
Figure 6 is a diagram of the electrical circuit.

As seen in Fig. 6, the resistance wires 33, 34, comprise a double helix. The bottom terminals 35, 36 of these helices are connected, for example, as at 37 in Fig. 5, to a pair of supporting and contact legs 38, 39, which, like the third leg 40 of the trio of legs (Fig. 3) are removably set in conductor clips (Fig. 2). The top terminals of the resistance wires 33, 34, have a common connection 41 (Fig. 6) to a wire 42 or its equivalent, which is connected to the foregoing third leg 40.

Three identically made porcelain or similar insulating blocks 44 are secured upon the base 1 in radial positions (Fig. 3) by the same bolts 45 which hold the previously mentioned conductor clips, now designated 46, in place. Each of the three legs 38, 39 and 40 has a rectangular end piece 47 which is fitted in the respective conductor clip, where it is held by spring tension. The heating element 22, however, is readily taken out by pulling up on it, the grid 15 being necessarily removed first.

A bus 43 electrically connects the bolts 45 (Fig. 2). A feed wire 48 is connected to one of the bolts in common with the respective end of the bus. A companion feed wire 49 is connected to the third leg 40. The wires 48, 49 are attached to the terminals 50, 51, of three-heat switch 52. Said switch has a movable contactor 53 which is adjustable along the resistance 54, one end of which is also connected to terminal 50. Wires 55, 56, lead to the current supply. The setting of the switch governs the degree of heating of the resistance wires 33, 34.

Figure 5:
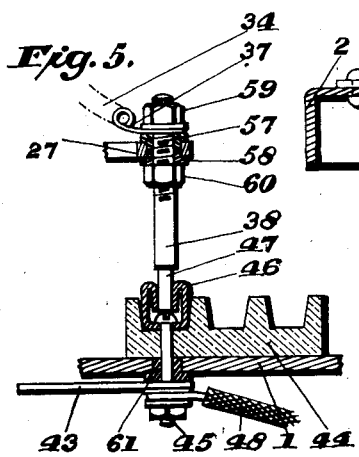
Figure 5 is a detail section taken substantially on the line 5—5 of Fig. 3, particularly illustrating one of the supporting and contact legs.
Figures 3, 4:
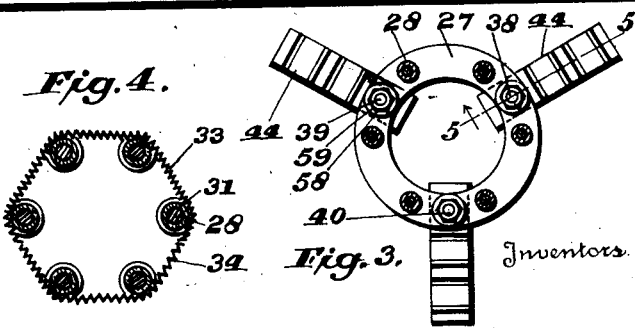
Figure 3 is a cross section taken on the line 3—3 of Fig. 2.
Figure 4 is a cross section taken on the line 4—4 of Fig. 2.

As plainly seen in Figs. 2 and 4, the foregoing resistance wires 33, 34 are wound from one insulator 31 to the next, the pitch of the windings being so ordered that the double helix previously mentioned will be formed. As regards the details of the heating element, it is seen in Fig. 5 that each one of the supporting and contact legs (the leg 38 being herein shown for example) has its upper threaded end 57 bushed in insulators 58 which fit in a hole in the bottom ring 27 where they are clamped by the nuts 59, 60. The respective bolt 45 is additionally insulated from the base 1 by an insulating bushing 61 through which it goes, as shown.

It is believed unnecessary to add to the previous description of Fig. 8 other than to point out that the suspension of the heater in the box 5 below the floor surface is calculated to produce a somewhat more vigorous inflow of cool air and outflow of warmed and humidified air than is possible with the surface type of heater shown in Figs. 1 and 2. However, both types of heaters are well adapted to each of the uses to which it is put.

In order to increase the heating capacity of the element 22 it is proposed to locate in the latter a smaller heating element 62 (Fig. 9). The latter is independent of the main element 22, and either element can be lifted out without removing the other, the current connections being arranged as presently appears.

The bottom ring 27 is used as before. The internally situated heating element 62 includes upright rods 64 which are secured to top and bottom rings 65, 67, by screws, as shown. Small insulators 66, assembled on the rods 64, provide the requisite insulation for the resistance wires 63. These are joined to contact legs 68, 69 and 70 (Fig. 11) in a manner identical to that in which 33 and 34 (Fig. 6) are joined to the legs 38, 39 and 40. The legs 68, 69 and 70 are inserted in the blocks 44 which are slightly modified for the purposes of the double heating element, as illustrated in one instance in Fig. 12.

Here the block 44 has an extra contact clip 71, which agrees in position to the contact leg 69. The clips 46, 71, are bridged in any preferred manner, for example by means of a wire 72 so that current will be supplied to the internal element by way of the leg 69 in the same manner as current is supplied to the internal element by way of the leg 39.

The operation is readily understood. In either type of the electric heater (Figs. 1 and 8) one has only to see that the container 9 is well filled with water. The switch 52 is turned according to the heat desired from the resistance wires 33, 34.

As the warmed air escapes at the upper outlet 12 (Fig. 2) cooler air is drawn in at the inlet 13 where the process of heating is repeated. Most of the freshly indrawn air will pass up the center of the adjustable shield 18, 19, and, naturally, up the center of the heating element 22 itself. Some of the air will travel the passageway 20, but here the heating effect is only indirect because of the interposition of the shield. As the warmed air passes the open top of the water container 9 it will pick up some of the vapor that rises from the surface of the water due to evaporation. It is thus that the heated air is humidified.

The amount of moisture to be picked up by the warmed air is subject to control by the setting of the sections of the shield 18, 19. As these are telescoped within each other, the radiant heat will strike the interior wall 11 directly to a greater extent with the result that the additionally warmed water will produce vapor more freely.

The top section or cone 18 can be let down so as to directly warm only the top zone of the water, or the bottom section 19 can be drawn up to heat the water from the bottom. The adjustment of the cones or sections 18, 19 is a matter of judgment and the user will arrive at a setting which best suits his requirement in the matter of humidifying the air.

In practice it will not be necessary to keep up the supply of water 14 by pouring it in from a cup. The heater is intended in many instances to be a permanent installation in a residence or other building. A pipe will lead to the container 9 from the common water supply and a float valve mechanism (not shown) will be used to replenish the supply when the water level falls flush.

We claim:

1. A space heater comprising a centralized heating element, a circumannular water container in which said element is situated, a sectional shield situated between the heating element and said interior wall defining an annular air passageway, and means for variously adjusting and setting the sections relatively to each other and to said interior wall to vary the amount of surface of the interior wall to be exposed directly to the heating element.

2. A heater comprising a heating element, a water container which has a frusto-conical interior wall which flares from a bottom air inlet to an upper air outlet, said element being situated in the space defined by said wall, a shield between the heating element and said wall, consisting of sections shaped to correspond to said wall, and means by which to adjust each of the sections independently.

3. A heater comprising a heating element, a water container which has an interior frusto-conically shaped wall flaring from a bottom air inlet to an upper air outlet, said element being situated in the space defined by said wall, a shield surrounding said element consisting of at least one frusto-conically shaped section, screw stems extending upwardly from said section, a suspension member set upon the water container, and through which the screw stems are extended, and nuts on the screw stems bearing on the suspension member and being adjustable to raise or lower the shield section.

4. A heater comprising a water container which is open at the top, said water container including an interior frusto-conically shaped wall which flares from a bottom air inlet to an upper air outlet, a heating element situated in the space defined by said wall, and a shield which is adjustable around the heating element to vary the size of an air passageway betwen the shield and said wall to regulate the amount of direct heat against said wall from the heating element and the consequent amount of liberated water vapor.

5. A heater comprising a base, an interiorly walled water container defining a passageway open to the atmosphere at the bottom and top, means by which said water container is supported in spaced relationship to the base so as to have a clear entrance for a relatively cool air, an electrical heating element situated centrally of the passageway to warm the air on its way up, electrical conductor clips mounted on the base, and combined supporting and contact legs depending from the heating element, bridging the air entrance and being removably attached to said clips.

DAVID A. SHEPHERD.
MARCUS C. STEWART.